US005738809A

United States Patent [19]

Hara et al.

[11] Patent Number: 5,738,809

[45] Date of Patent: Apr. 14, 1998

[54] INJECTION CONTROL METHOD FOR INJECTION MOLDING MACHINE

[75] Inventors: Keisuke Hara, Akashi; Shiro Miyamoto, Kakogawa, both of Japan

[73] Assignee: Tokyo Machinery & Metal Co., Ltd., Akashi, Japan

[21] Appl. No.: 636,858

[22] Filed: Apr. 23, 1996

[30] Foreign Application Priority Data

Apr. 24, 1995 [JP] Japan .................................. 7-098647

[51] Int. Cl.[6] .................................................. B29C 45/77

[52] U.S. Cl. ........................ 264/40.5; 264/40.7; 425/145; 425/149

[58] Field of Search ................................ 264/40.1, 40.5, 264/40.7; 425/149, 145, 135

[56] References Cited

U.S. PATENT DOCUMENTS

| | | | |
|---|---|---|---|
| 4,695,237 | 9/1987 | Inaba | 425/149 |
| 5,195,029 | 3/1993 | Murai et al. | 425/149 |
| 5,275,768 | 1/1994 | Inaba et al. | 425/135 |
| 5,296,179 | 3/1994 | Kamiguchi et al. | 425/145 |
| 5,350,546 | 9/1994 | Takeuchi et al. | 425/135 |

FOREIGN PATENT DOCUMENTS

| | | |
|---|---|---|
| 7-64003 | 7/1995 | Japan . |

*Primary Examiner*—Tim Heitbrink

*Attorney, Agent, or Firm*—Evenson, McKeown, Edwards & Lenahan, P.L.L.C.

[57] ABSTRACT

A primary injection stroke of a trial shot, which precedes a continuous molding operation, is performed with a pressure regulating value maintained constant by speed feedback control from initiation of the primary injection stroke until a measured value of pressure reaches the pressure regulating value and, after the measured value of pressure has reached the pressure regulating value, the speed feedback control is switched to pressure-priority control under an open loop control and the primary injection stroke is performed up to a dwell pressure change-over point. An entire range of a primary injection stroke of the continuous molding operation is then performed by speed feedback control while using, as target speed data in the primary injection stroke of the continuous molding operation, a pattern of speed values measured during the primary injection stroke in the trial shot upon confirmation of molding of a non-defective product.

6 Claims, 3 Drawing Sheets

STROKE SENSOR 2
PRESSURE SENSOR 3
INPUT PROCESSING UNIT 18
INPUT PROCESSING UNIT 19
CLOCK 15
SPEED CALCULATION UNIT 16
TRIAL SHOT CONDITION SETTING & STORAGE UNIT 11
INJECTION STROKE CONTROL UNIT 14
NATURAL FLOW CONTROL UNIT 14a
SPEED FEEDBACK CONTROL UNIT 14b
PRESSURE FEEDBACK CONTROL UNIT 14c
MEASURED SPEED PATTERN FORMING UNIT 17
PRESET PRIMARY INJECTION DATA STORAGE UNIT 12
PRESET DWELLING DATA STORAGE UNIT 13
DRIVER 5
INJECTION SERVOMOTOR 4
MICROCOMPUTER 1

INJECTION CONTROL METHOD FOR INJECTION MOLDING MACHINE

BACKGROUND OF THE INVENTION a) Field of the Invention

This invention relates to an injection control method for an injection molding machine of the in-line screw type, and especially to a control method for an injection molding machine, which can be suitably applied upon molding a product while making use of molding conditions for a so-called natural flow as primary injection conditions.

b) Description of the Related Art

Many types of injection molding machines each of which uses a servomotor as an injection drive source and controls an injection stroke (a primary injection control and its subsequent dwell stroke) are recently available on the market because they permit precise speed feedback control and pressure feedback control.

In an injection molding machine in which such feedback controls are performed, it has generally been the practice to control a primary injection stroke—a stroke from a metering completing position (i.e., injection initiating position) to a packing completing position (i.e., dwell pressure change-over point)—by speed feedback control and a dwell stroke by pressure feedback control. Described specifically, during the primary injection stroke, target values of speed are preset along a screw stroke (at advanced positions of the screw) and speed feedback control is performed to make measured values of speed coincide with the target values of speed. During the dwell stroke, on the other hand, target values of pressure are preset along an axis of time and pressure feedback control is performed to make measured values of pressure coincide with the target values of pressure.

Since the speed feedback control is performed until the end of the primary injection stroke as described above, the above injection control method is accompanied by the problem that, even when the pressure of a resin substantially increases in a final stage of the primary injection stroke due to an unforeseen accident (for example, by the completion of packing before a dwell pressure change-over point), the pressure of resin is increased further to cause an over-packing (excessive packing) because the speed feedback control is forcedly performed to maintain a speed conforming with a target value of speed.

On the other hand, according to control of molding by a natural flow, pressure-priority control is performed as open loop control from an intermediate point of a primary injection stroke so that the pressure is controlled to make it follow a pressure regulating value preset at a constant value of pressure over the entire range of the primary injection stroke until a final point of the primary injection stroke (i.e., a dwell pressure change-over point) is reached. Insofar as the above-described pressure regulating value is preset at an appropriate value, this control method is free of the potential problem that such over-packing would occur as described above. It is designed that, even in molding by a natural flow, the primary injection range is controlled in speed up to an intermediate point along a screw stroke (at advanced positions of the screw) and thereafter, in pressure.

A limitation is imposed on an applicable range of molded articles which can be molded (as non-defective products) under molding conditions for such a natural flow. However, this molding control is suited, for example, for "heavy-gauge or thick" molded articles which feature packing at a relatively low speed in a final stage of injection and packing (i.e., a final stage of a primary injection stroke), and is often applied to such molded articles.

Molding making use of the so-called natural flow does not cause over-packing (excessive packing) as described above. However, when pressure-priority control is performed, the speed is practically ignored and the pressure is controlled. This control method is therefore accompanied by the problem that in the range of this pressure-priority control, the speed varies depending on the applied pressure, resulting in poor reproducibility and unstable one-shot cycle time. Unless the metered amount of resin remains stable, in other words, the metering completing position remains stable from one shot to another, a further problem arises, the resulting molded articles do not remain stable in weight, thereby failing to mold non-defective products.

SUMMARY OF THE INVENTION

With the foregoing in view, an object of the present invention is to realize an injection control method with good repetition stability (reproducibility) while meeting molding conditions available from the application of a natural flow. Another object of the present invention is to stabilize the weight of each molded article and also to perform molding of a non-defective product irrespective of the metered amount of resin (i.e., the metering completing position) in each shot.

In one aspect of the present invention, there is thus provided an injection control method for an injection molding machine in which rotation of a screw in a heating cylinder transfers a resin material under kneading and plasticization to a side of a free end of said screw to store a metered amount of the resin material in a molten form on the side of said free end of said screw and a subsequent advance of said screw injects and packs the metered amount of the resin material in the molten form into a mold, which comprises:

- performing a primary injection stroke of a trial shot, which precedes a continuous molding operation, with a pressure regulating value maintained constant by speed feedback control from initiation of said primary injection stroke until a measured value of pressure reaches said pressure regulating value and, after said measured value of pressure has reached said pressure regulating value, switching said speed feedback control to pressure-priority control under an open loop control and then performing said primary injection stroke up to a dwell pressure change-over point; and
- performing an entire range of a primary injection stroke of said continuous molding operation by speed feedback control while using, as target speed data in said primary injection stroke of said continuous molding operation, at least a pattern of speed values measured after said control switching point out of a pattern of speed values measured during said primary injection stroke in said trial shot upon confirmation of molding of a non-defective product.

A microcomputer, which manages the overall control of the injection molding machine, first initiates the primary injection stroke of the trial shot by the speed feedback control with reference to preset conditions for the trial shot. Here, for the range of the primary injection stroke, a pressure regulating value of a constant value has been preset for the regulation of an upper limit of speed. The microcomputer monitors a measured value of pressure, said measured value increasing with a progress of injection and packing, to determine whether the measured value of pressure has reached the pressure regulating value. At the time point that the measured pressure value has coincided with the pressure regulating value in the course of the primary injection stroke, the microcomputer terminates the speed feedback control and instead, starts the pressure-priority control as open loop control so that the measured pressure value follows the pressure regulating value. This pressure-priority control is performed up to a dwell pressure change-over point (an end point of the primary injection stroke).

Measured values of speed in the primary injection stroke of the trial shot are inputted into the microcomputer, and are stored as a pattern of measured values of speed (hereinafter called the "measured speed value pattern). By an operator's instruction to the microcomputer, for example, to the effect that molding of a non-defective product by the above trial shot has been confirmed, the microcomputer sets the measured speed value pattern, said pattern having been formed from the measured values, as a target speed pattern for a primary injection stroke of a continuous molding operation. After that, speed feedback control is performed so that over the entire range of the primary injection stroke of the continuous molding operation, the measured values of speed trace the thus-set target speed pattern.

Adoption of such a method makes it possible to meet molding conditions similar to those available from the application of a natural flow without occurrence of overpacking although the primary injection stroke is performed under speed feedback control over the entire range thereof. Further, owing to the speed feedback control of the entire range of the primary injection stroke, excellent repetition stability (reproducibility) is brought about.

In addition, the target speed pattern extends corresponding to relative advancements of the screw. Even when the metered amount of resin varies from one shot to another (in other words, even when variations arise in the injection initiating position as a metering completing position), the pressure of resin at the dwell pressure change-over point (the packing completing position) remains constant although a cushion varies. The density of each molded article is stabilized and the weight of each molded article is hence stabilized. The term "cushion" as used herein means an amount of molten resin still remaining in a small amount at a free end of a screw upon completion of primary injection.

DETAILED DESCRIPTION OF PREFERRED EMBODIMENT

Details of the present invention will hereinafter be described based on the first embodiment.

Figure 1:
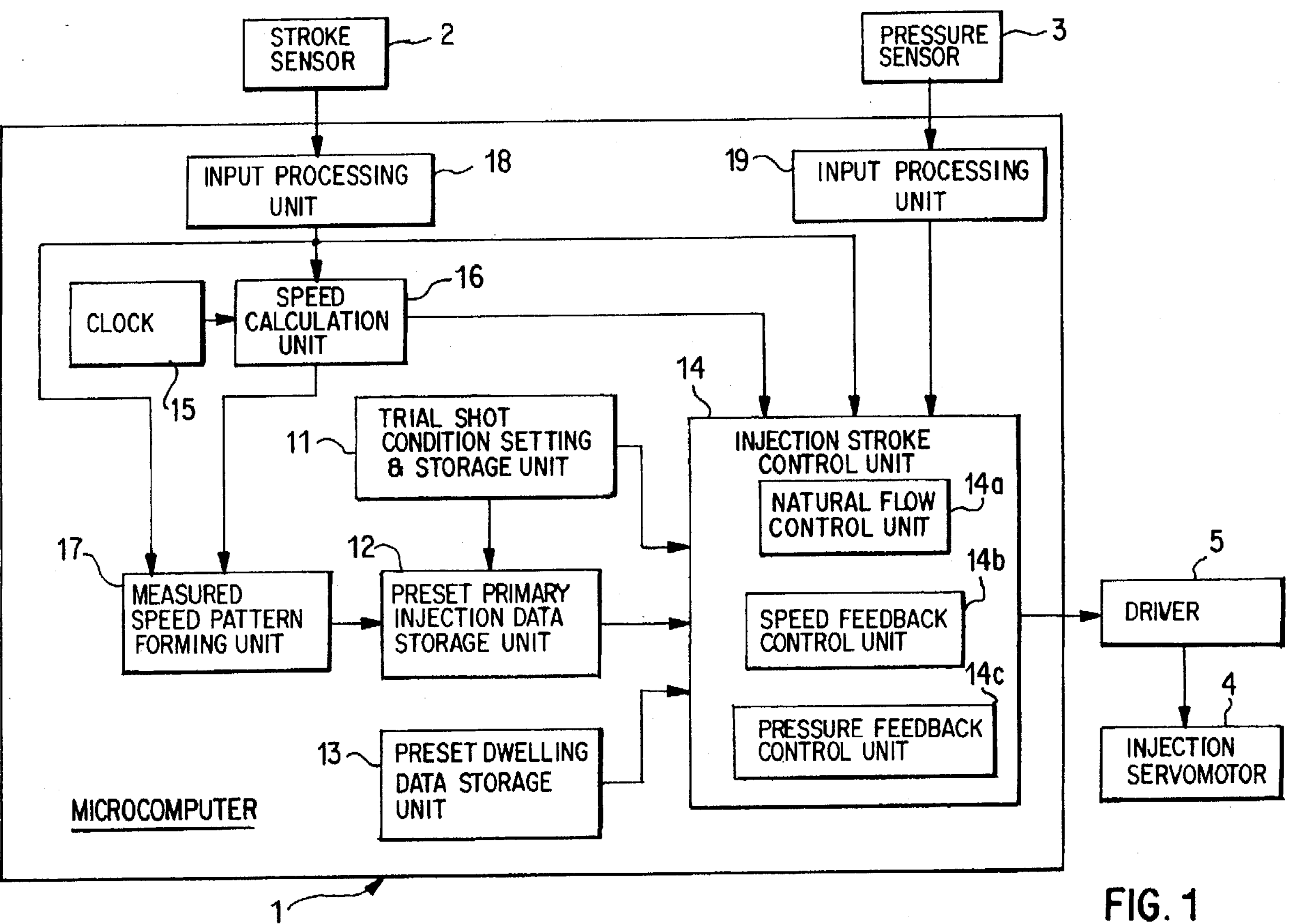
FIG. 1 is a block diagram showing the construction of an essential part of a control system in an injection molding machine according to a first embodiment of the present invention.

It is to be noted that FIG. 1 illustrates only a control system which is associated with an injection stroke.

In FIG. 1, numeral 1 indicates a microcomputer. Actually, this microcomputer 1 is constructed of that equipped with MPU, ROM, RAM, various I/O interfaces, and the like. It performs various processings in accordance with various programs prepared in advance, thereby managing overall control of an injection molding machine. A description will hereinafter be made assuming for the sake of convenience of explanation that as a function block associated with the injection stroke as described above, the microcomputer 1 in this embodiment is equipped with a trial shot condition setting and storage unit 11, a preset primary injection data storage unit 12, an injection stroke control unit 14 including a natural flow control unit 14*a*, a speed feedback control unit 14*b* and a pressure feed back control unit 14*c*, a clock unit 15, a speed calculation unit 16, a measured speed pattern forming unit 17, and input processing units 18,19.

Also illustrated in FIG. 1 are a stroke sensor 2 for the detection of a position of a known screw (not shown), a pressure sensor 3 for the detection of a pressure of a resin compressed by the screw (i.e., a pressure of a resin to be injected and packed into a mold), an injection servomotor 4 as an injection drive source for moving the screw forward or rearward, and a driver 5 for the motor 4.

The stroke sensor 2 detects information on a position of the unillustrated screw. After the information so detected is subjected to conversion processing at the input processing unit 18 as needed, the thus-converted information is sent out to the injection stroke control unit 14, the speed calculation unit 16 and the measured speed pattern forming unit 17. The speed calculation unit 16 calculates a measured value of speed of the screw in real time responsive to a clock signal from the clock unit 15 on the basis of position data from the input processing unit 18, and sends out the measured value of speed of the screw to the injection stroke control unit 14 and the measured speed pattern forming unit 17. The pressure sensor 3 detects a pressure of the resin and after being subjected to conversion processing at the input processing unit 19 as needed, the pressure of the resin is sent out to the injection stroke control unit 14.

In the trial shot condition setting and storage unit 11, control conditions for the primary injection stroke in the trial shot, said control conditions having been inputted by the operator's key operation, are stored in a reloadable form. Specifically, the control conditions so set and stored include target values of speed along a screw stroke (i.e., at advanced screw positions) in a primary injection range, a pressure regulating value which is constant over the entire range of primary injection for the control of the primary injection range by speed feedback control, another pressure regulating value which is constant over the entire primary injection range for the control of the primary injection range under control conditions for a natural flow, and a dwell pressure change-over point (i.e., an advancement of the screw from an injection initiating position to a packing completing position).

In the preset primary injection data storage unit 12, control conditions for the primary injection range are stored for a continuous molding operation. When molding of a non-defective product in the trial shot has been confirmed as will be described subsequently herein and the operator has instructed the microcomputer 1 to input and store preset data for primary injection, control condition data for injection molding are stored in the storage unit 12. Set and stored in this preset primary injection data storage unit 12 are target speed values along the screw stroke (at advanced screw positions) in the primary injection range to control the entire primary injection range by speed feedback control and a dwell pressure change-over point (i.e., an advancement of the screw from an injection initiating position to a packing completing position).

In the preset dwelling data storage unit 13, control conditions in the dwelling range for a continuous molding operation are stored. This embodiment is designed to also permit use of the control condition data of the storage unit 13 in the below-described dwell stroke of the trial shot. Also set and stored in the preset dwelling data storage unit 13 are target pressure values along an axis of time in a dwelling range for the control of the whole range of dwelling.

The injection stroke control unit 14 drives, via the driver 5, the injection servomotor 4 under control by the natural flow control unit **14*a*, the speed feedback control unit 14*b* and the pressure feedback control unit 14*c* on the basis of control condition data for the primary injection stroke and dwell stroke, said data being stored in the respective storage units 11,12,13, while referring to screw position information from the stroke sensor 2, resin pressure information from the pressure sensor 3, clock information from the clock unit 15 and speed information from the speed calculation unit 16. Namely, during an injection stroke of a trial shot which will be described subsequently herein, the injection stroke control unit 14 controls a primary injection stroke on the basis of the control condition data of the trial shot condition setting and storage unit 11. During a continuous molding operation, on the other hand, the injection stroke control unit 14 controls the primary injection stroke on the basis of the control condition data of the preset primary injection data storage unit 12. Incidentally, as dwell control data for the trial shot and the continuous molding operation, the contents of the preset dwelling data storage unit 13** are used for both the trial shot and the continuous molding operation.

The primary injection in the injection stroke of the trial shot is conducted as will be described next. Namely, using the speed feedback control unit **14*b*, injection and packing is started from the injection initiating position under the speed feedback control. When the measured value of pressure, which increases as the packing proceeds, has reached the preset pressure regulating value, the speed feedback control is stopped. Using the natural flow control unit 14*a* next, the pressure-priority control is started as open loop control so that the pressure follows the pressure regulating value. On the other hand, the primary injection in the injection stroke of the continuous molding operation is performed under the speed feedback control from the injection initiating position to the dwell pressure change-over point (in other words, over the entire range of the primary injection) by using the speed feedback control unit 14*b*. Incidentally, during both the trial shot and the injection stroke of the continuous molding operation, dwelling is performed under the pressure feedback control by using the pressure feedback control unit 14*c***.

The measured speed pattern forming unit 17, in at least the trial shot, forms a pattern of measured values of speed along the screw stroke (at advanced positions of the screw) in the primary injection range by using inputted screw position information and speed information and retains the pattern. In accordance with an instruction by the operator, the measured speed pattern forming unit 17 transfers the thus-held contents to the preset primary injection storage unit 12 optionally after subjecting the contents to conversion as needed.

The injecting operation during the trial shot and that during the continuous molding operation according to the present invention will next be described with reference to FIG. 2 and FIG. 3.

Figure 2:
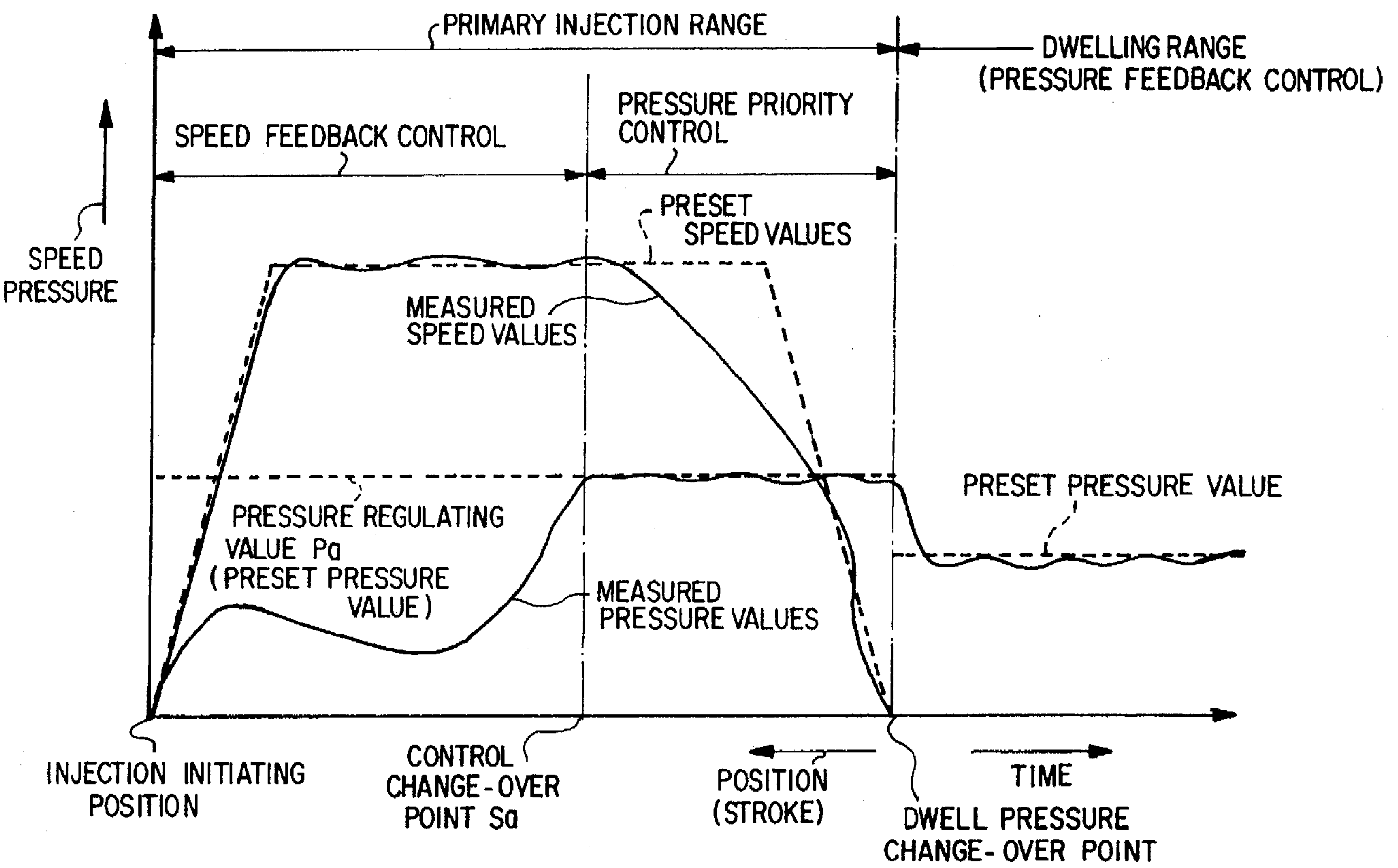
FIG. 2 is a diagrammatic representation showing the manner of control in an injection stroke at the time of a trial shot according to the first embodiment of the present invention.

In FIG. 2, speeds (advancing speeds of the screw) and pressures (resin pressures) are plotted along the ordinate, whereas along the abscissa, positions (screw stroke) are plotted from the injection initiating position to the dwell pressure change-over point and times are plotted after the dwell pressure change-over point (in the diagram, on a right-hand side of the dwell pressure change-over point).

During the trial shot preceding the continuous molding operation, the microcomputer 1 first initiates the primary injection stroke of the trial shot under the speed feedback control with reference to the conditions preset for the trial shot. As is illustrated in FIG. 2, the screw is therefore caused to advance from the injection initiating position to initiate injection and packing while the advancing speed of the screw is controlled to make measured values of speed coincide with their corresponding preset values of speed. To specify an upper limit of the advancing speed of the screw in the range of the primary injection stroke, a pressure regulating value Pa has been set as a constant value as described above. During the primary injection stroke of the trial shot, the microcomputer 1 monitors measured values of pressure, which increase as the injection and packing proceeds, to determine whether each of the measured values of pressure has reached the pressure regulating value Pa.

At the time that a measured value of pressure has coincided with the pressure regulating value Pa in the course of the primary injection stroke, in other words, at a control change-over point indicated by Sa in FIG. 2, the microcomputer 1 terminates the speed feedback control and instead, starts the pressure-priority control as open loop control so that measured values of pressure follow the pressure regulating value Pa. The microcomputer 1 performs this pressure-priority control up to the dwell pressure change-over point (the end point of the primary injection stroke).

When the dwell pressure change-over point has been reached, the microcomputer 1 initiates a dwelling operation under the pressure feedback control to control the pressure so that measured values of pressure simulate a pressure value preset for the dwelling range.

The measured values of speed in the primary injection stroke of the trial shot are inputted into the microcomputer 1 and at the measured speed pattern forming unit 17, a measured speed value pattern corresponding to the primary injection range is formed and then retained. A molded article obtained by the trial shot is subjected to visual inspection or the like by the operator to determine whether it is defective or non-defective. When molding of a non-defective product by such a trial shot has been confirmed, the operator gives an instruction to the microcomputer 1 so that the measured speed value pattern data held at the measured speed pattern forming unit 17 are transferred to the preset primary injection data storage unit and are set and stored as control condition data (i.e., data of target speed values along the screw stroke) for the primary injection range. Incidentally, other control condition data for the primary injection range, such as dwell pressure change-over point data, may be stored beforehand in the preset primary injection data storage unit 12 or may be transferred from the trial shot condition setting and storage unit 11 to the preset primary injection data storage unit 12 concurrently with the above-described transfer of the measured speed value pattern data.

In the manner as described above, subsequent to setting and storage of all the control condition data for the primary injection range in the preset primary injection data storage unit 12, the entire range of the primary injection stroke of the continuous molding operation is performed under the speed feedback control so that the target speed pattern set in the preset primary injection data storage unit 12 is followed.

Figure 3:
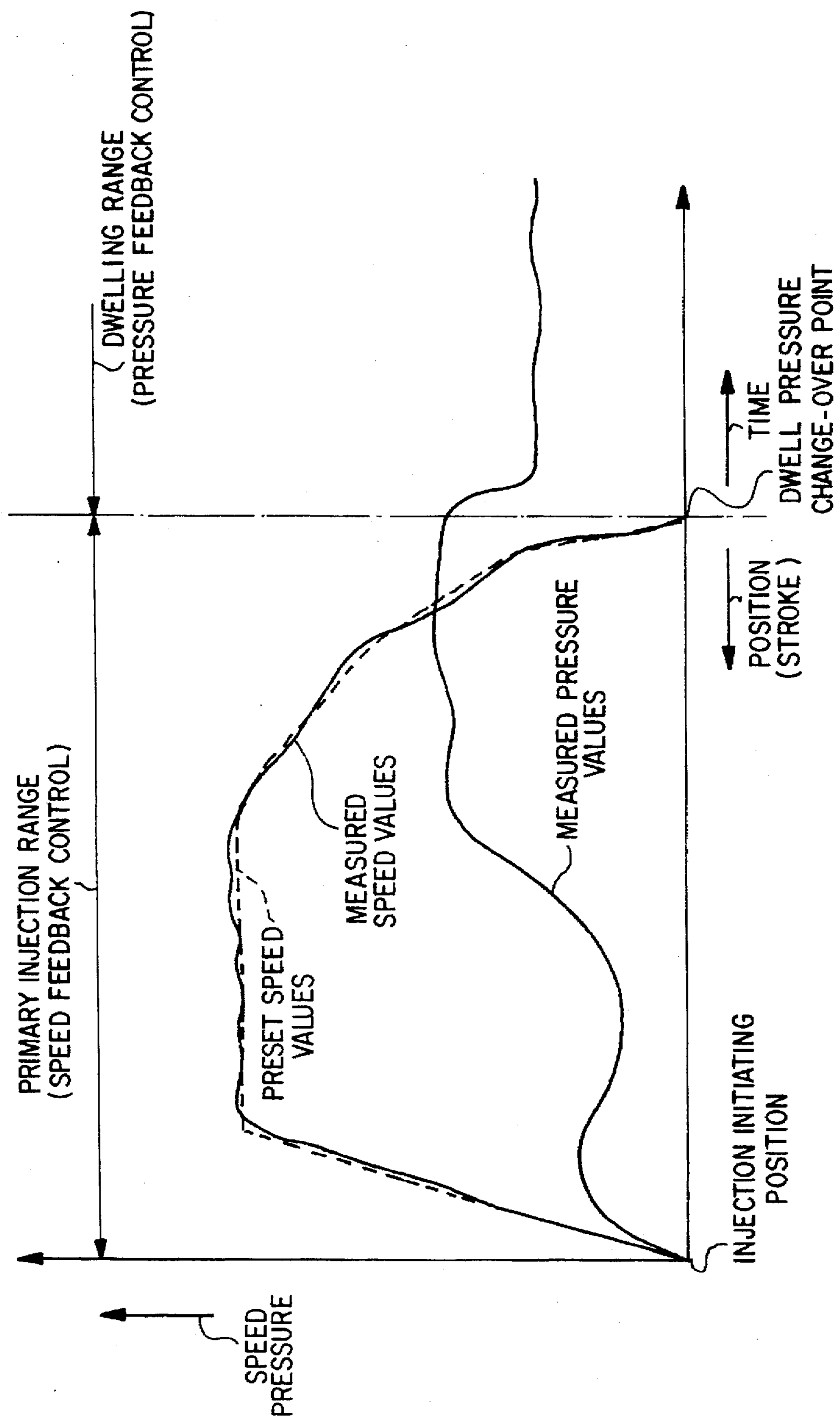
FIG. 3 is a diagrammatic representation illustrating the manner of control in an injection stroke at the time of a continuous molding operation according to the first embodiment of the present invention.

In FIG. 3, speeds (advancing speeds of the screw) and pressures (resin pressures) are plotted along the ordinate, whereas along the abscissa, positions (screw stroke) are plotted from the injection initiating position to the dwell pressure change-over point and times are plotted after the dwell pressure change-over point (in the diagram, on a right-hand side of the dwell pressure change-over point).

During the continuous molding operation, the microcomputer 1 performs the whole range of the primary injection of the injection stroke (from the injection initiating position to the dwell pressure change-over point) under the speed feedback control with reference to the preset conditions for the continuous molding operation. The pattern which is shown by a broken line in FIG. 3 indicates values of speed (target speed pattern) preset based on the measured speed value pattern obtained by the trial shot. The speed feedback control is performed so that measured values of speed coincide with their corresponding preset speed values, whereby injection and packing is conducted.

When the dwell pressure change-over point has been reached, the microcomputer 1 initiates a dwelling operation under the pressure feedback control. It is similar to the above-described control that the pressure is controlled to make the measured values of speed coincide the value of pressure preset for the dwelling range.

As has been described above, the present embodiment makes it possible to meet molding conditions similar to those available from application of a natural flow without occurrence of over-packing by performing the speed feedback control over the entire range of the primary injection stroke. Further, owing to the speed feedback control of the primary injection stroke over the entire range thereof, excellent repetition stability (reproducibility) has been brought about. Moreover, the target speed pattern has been set corresponding to respective relative advancements of the screw so that, even when the metered amount of resin varies from one shot to another (in other words, even when variations arise in the injection initiating position as a metering completing position), the pressure of resin at the dwell pressure change-over point (the packing completing position) remains constant although a cushion varies. Accordingly, the density of each molded article is stabilized and the weight of each molded article is also stabilized.

In the above-described embodiment, the target speed data for the primary injection range of the continuous molding operation were obtained using the pattern of all the speed values measured during the primary injection range obtained in the trial shot. Similar effects can be brought about even when the target speed data for the primary injection range of the continuous molding operation are obtained by combining preset speed data for the trial shot up to the above-described control change-over point Sa in the primary injection range of the trial shot with a measured speed value pattern for the range after the control change-over point Sa.

We claim:

1. A method for determining a proper screw speed profile in an injection molding machine in which rotation of a screw injects and packs a resin material into a mold during a primary injection stroke, comprising:

performing said primary injection stroke of a trial shot prior to a continuous molding operation according to the following steps: (a) maintaining a speed of said screw according to preset speed values by speed feedback control from initiation of said primary injection stroke until a measured value of pressure of said resin material reaches a preset pressure regulating value at a control changeover point; (b) after said control changeover point, switching said speed feedback control to pressure-priority control under an open loop control in order to maintain the pressure of said resin material at said preset pressure regulating value until a dwell pressure change-over point is reached; and (c) recording a pattern of values of the speed of said screw at least during step (b) in determining said proper screw speed profile once a desired product is achieved; and performing said primary injection stroke during said continuous molding operation by speed feedback control using at least said pattern of speed values recorded in step (c) as target speed data.

2. A method according to claim 1, wherein step (c) comprises recording a pattern of values of the speed of said screw during steps (a) and (b), and wherein said target speed data for an entire range of said primary injection stroke of said continuous molding operation comprise said pattern of values recorded in step (c).

3. A method according to claim 1, wherein said target speed data for an entire range of said primary injection stroke of said continuous molding operation comprise said preset speed values for said trial shot up to said control switching point and said pattern of speed values recorded in step (c) after said control switching point.

4. A method for determining a proper screw speed profile in an injection molding machine in which rotation of a screw injects and packs a resin material into a mold during a primary injection stroke, comprising the steps of:

(i) performing said primary injection stroke of a trial shot prior to a continuous molding operation according to the following steps: (a) maintaining a speed of said screw according to preset speed values from initiation of said primary injection stroke until a measured value of pressure of said resin material reaches a preset pressure regulating value; (b) after said measured value of pressure has reached said preset pressure regulating value, adjusting the speed of said screw in order to maintain the pressure of said resin material at said preset pressure regulating value until termination of said primary injection stroke; and (c) recording a pattern of values of the speed of said screw at least during step (b) in determining said proper screw speed profile once a desired product is achieved; and (ii) performing said primary injection stroke during said continuous molding operation by maintaining the speed of said screw according to said pattern of values recorded in step (c).

5. A method according to claim 4, wherein step (c) comprises recording a pattern of values of the speed of said screw during both of steps (a) and (b).

6. A method according to claim 4, wherein in step (ii) the speed of said screw is maintained according to a combination of said preset speed values and said pattern of values recorded in step (c) only during step (b).

* * * * *